Jan. 20, 1959  C. F. ARNOLD ET AL  2,870,362
PRE-AIMED LIGHT PROJECTOR
Filed June 15, 1955  2 Sheets-Sheet 1
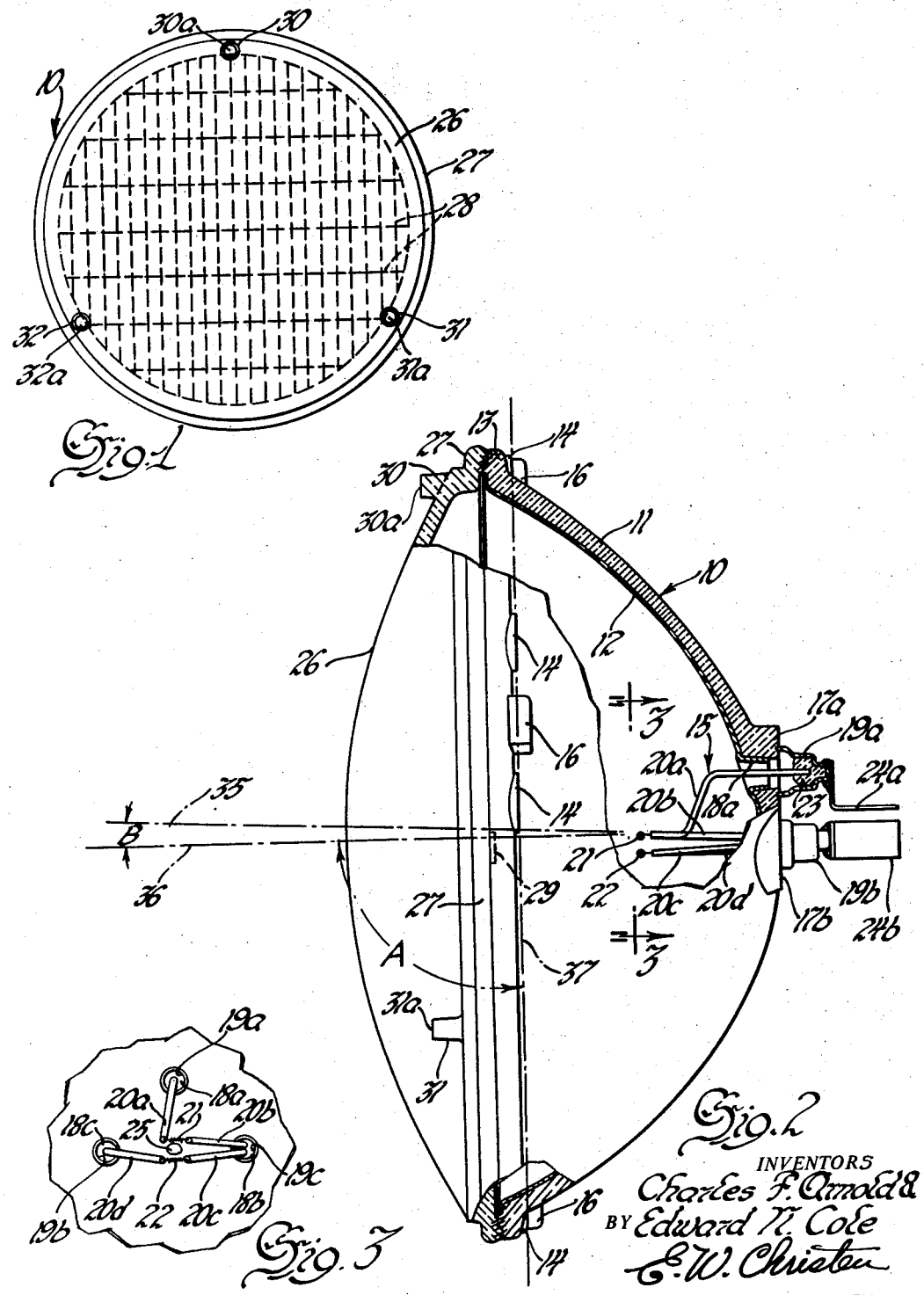
INVENTORS
Charles F. Arnold &
BY Edward N. Cole
E. W. Christen
ATTORNEY Jan. 20, 1959 C. F. ARNOLD ET AL 2,870,362
PRE-AIMED LIGHT PROJECTOR
Filed June 15, 1955 2 Sheets-Sheet 2

INVENTORS
Charles F. Arnold &
BY Edward N. Cole
E. W. Christen
ATTORNEY

United States Patent Office 2,870,362
Patented Jan. 20, 1959

2,870,362

PRE-AIMED LIGHT PROJECTOR

Charles F. Arnold and Edward N. Cole, Detroit, Mich., assignors to General Motors Corporation, Detroit, Mich., a corporation of Delaware Application June 15, 1955, Serial No. 515,684

11 Claims. (Cl. 313—113)

This invention relates to illuminating devices and more particularly to projection lamps including a combined light source and optical means for controlling the direction or distribution of light rays emanating from the source.

This invention may be embodied in projection lamps of various types and uses although it is especially well suited for vehicle headlamps. The vehicle lighting art has progressed in recent years to a high degree of development providing, in general, lamps of high efficiency, high candlepower, long life, and relatively low cost. Noteworthy in this respect are the lamps now known in the art as the "sealed beam" lamps such as the all glass and the composite types.

In projection lamps commercially available, even those representing the best presently known manufacturing techniques, there has remained the problem of insuring accurate and simple directional control of the projected light beam. Directional control or aiming is of utmost importance in vehicle headlamps. The effect sought to be achieved, in general, is the adequate illumination of the roadway so that the operator may observe road conditions sufficiently far in advance, even at high speeds, to adjust the vehicle operation accordingly. However, it is equally important to safe vehicle operation that the light directivity and intensity be such that the operator of an oncoming vehicle is not blinded. Thus, with vehicle lamps of the candlepower necessary for adequate roadway illumination, very accurate directional control of the light beam is imperative.

There have been numerous approaches in the prior art to the solution of the problem of aiming vehicle headlamps. These may be characterized generally as either optical aiming or geometrical aiming. In optical aiming the lamp is mounted on the vehicle and illuminated; the light beam is directed upon a simple, remotely located aiming screen or a more complex optical equivalent and the beam pattern is positioned by directional adjustment of the lamp. Optical aiming of this type has proved to be disadvantageous because it requires elaborate equipment. It is, however, quite accurate.

In geometrical aiming, the lamp is mounted on the vehicle and a selected axis of the lamp structure is directionally adjusted with reference to one or more axes of the vehicle. Geometrical aiming is highly advantageous in that the aiming apparatus required is simple and inexpensive. The aiming may be performed quickly and without the necessity of large space. Geometrical aiming heretofore has been inaccurate, however, because it presupposes the existence of a known relation between the projected light beam direction and the selected axis of the lamp structure. Such a known relation has not been obtained in commercially produced lamps because of lack of sufficient precision in the relative positioning of the parts of the optical system. Although there has been much effort to improve the assembly technique to insure the required precision, this effort has not yielded a commercially successful "optically perfect" lamp. As a result, commercial lamps are "optically imperfect" due to manufacturing tolerances inherent in the known techniques. This optical imperfection is manifested by the lack of uniformity among successive lamps, manufactured by the same apparatus and technique, of the relationship between light beam direction and a selected geometrical axis of the lamp structure.

However, the present-day commercial practice in the manufacture of lamps, even though it yields optically imperfect lamps, affords compelling advantages of efficient production. Therefore it is desirable to retain these advantages in the provision of a lamp which may be aimed with the simplicity of geometrical aiming and the accuracy of optical aiming.

Therefore, it is an object of this invention to provide a commercially produced projection lamp which may be aimed with optical precision by the use of geometrical aiming apparatus.

It is another object of this invention to provide a lamp which is pre-aimed in the manufacturing process to facilitate aiming in a simple and expedient manner when the lamp is subsequently installed for use.

A further object is to provide a projection lamp having means which are disposed in a predetermined relation to the light rays projected from the lamp.

Another object is to provide a lamp of the type which is provided with externally accessible means to facilitate precise geometrical aiming.

An additional object is to provide a projection lamp including means which define a plane having a known angular relation to the direction of a selected axis of the light beam projected by the lamp.

In the accomplishment of these and other objects there is provided a lamp including a light source and optical means and having plural reference points disposed upon the lamp structure which define a plane having a known angular relation to the direction of a selected portion of the light beam transmitted by the optical means. Upon installation of the lamp for its intended use, the reference points are employed in conjunction with aiming apparatus to permit accurate directional adjustment of the light beam from the lamp.

A more complete understanding of the invention may be had from the detailed description which follows taken with the accompanying drawings in which:

Figure 1 is a front view of the lens of the inventive lamp.

Figure 2 is a side view in partial section showing the inventive projection lamp.

Figure 3 is a fragmentary view taken on line 3—3 of Fig. 2 showing a detail of construction.

Figure 4:
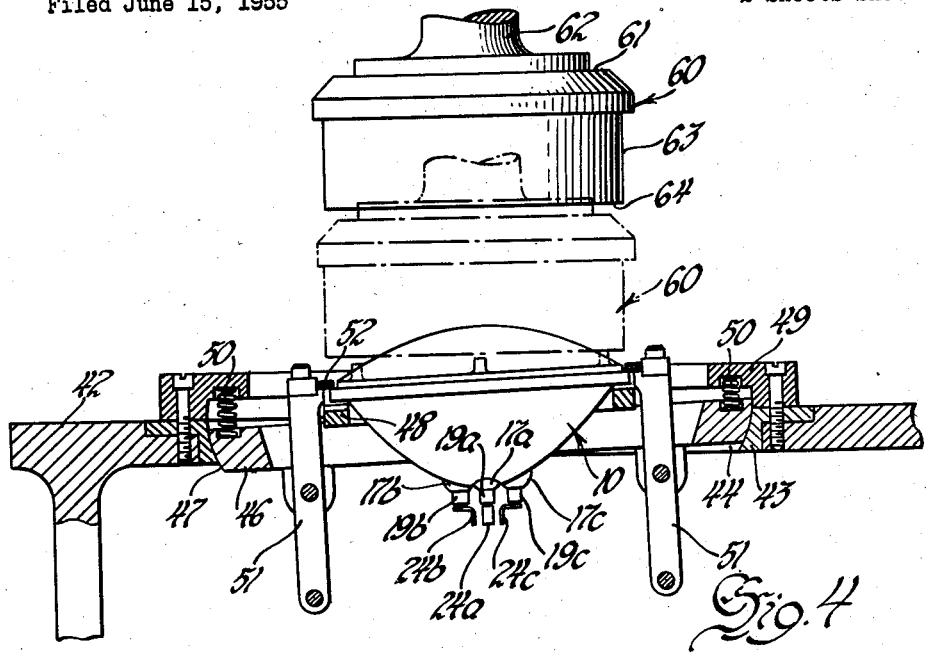
Figure 4 illustrates suitable apparatus for providing reference means on the lamp to effect pre-aiming.

In the specification there is employed the terminology "optically imperfect lamp" in recognition of the fact that strict optical perfection in lamp manufacture can not be attained. The meaning intended to be conveyed by this language is that the lamp is subject to optical inaccuracies occasioned by manufacturing tolerances which are acceptable in the commercial production of projection lamps. The optical imperfections which arise, for example, are lack of precision in locating the light source with respect to the focal point of an associated reflector, surface irregularities in the reflector which cause a departure from the desired mathematical curvature, and lack of precise positioning and orientation of the lens as well as surface irregularities therein. Such optically imperfect lamps are characterized by slight non-uniformity of optical properties among different lamps produced by the same technique and apparatus.

Referring now to the drawings, there is shown an illustrative embodiment of the invention in a projection lamp especially suitable for use as an automotive vehicle headlamp. The projection lamp illustrated is of the all glass sealed beam type although it will be understood that the invention is applicable to lamps of different types and for different uses.

The projection lamp 10 comprises, in general, a light source designated generally at 15, enclosed by a reflector 11 for imparting directional control to the light rays emanating from the light source, and an integrally joined lens or cover glass 26 which may impart distributional control to the light rays controlled by the reflector. The reflector 11 is provided with a reflective inner surface or coating 12, preferably a bright metallic deposit. The reflector 11 may be constructed of glass and is suitably molded to provide a configuration having the desired optical properties. For example, the inner surface may be a surface of revolution of parabaloidal curvature or a combination of such surfaces. The reflector 11 terminates in an annular flange 13 which is provided with a plurality of spaced seating surfaces 14 which define a mounting plane 37 and a plurality of orienting lugs 16 for engagement with an associated mounting surface (not shown) for installation of the lamp. The reflector 11 is provided with integrally formed spaced bosses 17a, 17b, and 17c which define passages 18a, 18b, and 18c, respectively, extending through the reflector. Disposed centrally of the bosses and extending through the reflector 11 is an evacuating passage 25.

The reflector 11 supports the light source 15 by means of ferrules 19a, 19b, and 19c disposed over passages 18a, 18b, and 18c, respectively. Each metal ferrule 19a, 19b, and 19c is embedded at its open end in the respective bosses 17a, 17b, and 17c to provide a gas tight seal and structural support for the ferrules. The metal ferrule 19a supports a lead wire 20a which is suitably secured to the ferrule by brazing material 23. Similarly, the ferrule 19c supports the lead wires 20b and 20c and the ferrule 19b supports the lead wire 20d. The lead wires are suitably formed to align the inner ends of lead wires 20a and 20b and to align the inner ends of lead wires 20c and 20d. A light source in the form of filament 21 is connected across lead wires 20a and 20b and may be disposed approximately at the focal point of the reflective surface 12 thus constituting the major filament for producing the major or upper beam to be projected from the lamp. The filament 22 is connected across lead wires 20c and 20d at an off-focal-point position and constitutes the minor filament for producing the minor or lower beam to be projected from the lamp. The ferrules 19a, 19b, and 19c are adapted for connection with an associated energizing circuit (not shown) by respective terminals 24a, 24b and 24c which are suitably affixed to the ferrules by soldering.

The lens or cover glass 26 suitably of molded glass is provided with an annular flange or rim 27 which is integrally joined by fusion to the annular flange 13 of the reflector 11. The interior surface of the lens 26 may be provided with fluting and light controlling prisms indicated schematically at 28 in a manner well understood by those skilled in the art. The lens 26 is oriented with respect to the reflector body 11 by a suitable orienting key or projection 29 on the annular flange 27. The lamp 10 comprising the integrally combined reflector body 11, lens 26, and light sources 21 and 22 is preferably filled with an inert gas to a pressure exceeding atmospheric pressure and the lamp is hermetically sealed by closure of the evacuating passage 25.

The projection lamp thus far described is known in the art as the all glass sealed beam lamp and so far as is known represents the application of the most advanced techniques in lamp manufacture. However, lamps of this type and other projection lamp types, such as that known as the composite sealed beam lamp, are optically imperfect lamps due to tolerances incident to the manufacturing techniques. An ideal projection lamp insofar as aiming the projected light is concerned may be considered, for explanatory purposes, one which directs selected light rays in a known direction relative to a selected geometrical axis of the lamp structure. This ideal lamp is not achieved in commercial production because of lack of precise relative positioning of the parts of the optical system and inaccuracies in individual parts of the system. Thus, a typical optically imperfect lamp, as illustrated in Figure 2, may have an actual optical axis 35 of a selected portion of the projected light rays which is not coincident with the intended or desired optical axis 36 having a known angular displacement A from a geometrical reference on the lamp structure such as the mounting plane 37 defined by the surface of seating lugs 14. Consequently, the actual optical axis 35 is displaced from the desired optical axis 36 by an unknown deviation angle B. The effect of the optical imperfections, whatever the cause, has been to preclude precise aiming of the projected light by simple geometrical aiming instruments.

In accordance with this invention, geometrical aiming of the projected light with optical precision is afforded by additional means on the lamp disposed in a known relation to the light rays projected therefrom. There is provided on the lamp structure, preferably at an accessible location, a plurality of spaced reference elements 30, 31, and 32. The reference elements may take the form of projections or bosses disposed adjacent the periphery of the lens 26 and preferably are formed integrally therewith and are equi-distantly spaced. The reference elements 30, 31, and 32 include surfaces 30a, 31a, and 32a, respectively, which define or lie in a common reference or aiming plane having a predetermined angular position with respect to the light rays projected from the lamp. With this known angular position, a geometrical instrument may be positioned with respect to the reference elements and the direction of the projected light may be adjusted by movement of the lamp structure a desired amount as measured by the instrument. Such a geometrical aiming instrument may be of the general type disclosed in United States Patent No. 2,831,262 issued April 22, 1958 to R. N. Falge and Earl M. Brohl and assigned to the same assignee as the present invention. With a known relation between the direction of the light rays and the plane defined by the reference elements, directional control or aiming of the light beam itself with optical accuracy is obtained.

It will be understood that the particular angular relation which is established between the aiming plane and the direction of the light rays is a matter of design choice in a given embodiment of the invention. Furthermore, this angular relation may be established between the aiming plane and any desired portion or axis of the light beam. In automotive vehicle headlamps, for example, it is a common practice to aim the headlamps to afford directional control of the most intense portion of the light beam produced by the major or upper beam filament. This intense portion of the beam is commonly referred to as the hot spot light whereas the surrounding portion of the beam is known as the body light. The distribution patterns of the hot spot light and the body light are controlled by appropriate optical design usually incorporated into the lens structure.

Thus, in the practice of this invention as applied to the automotive vehicle headlamps, it is preferred to establish the aiming plane at a known angular relationship with the direction of hot spot light portion of the projected beam. Furthermore, in automotive practice, it is desirable to aim the hot spot light in a direction which is angularly displaced from the longitudinal axis of the vehicle. The actual aim, for example, may be specified with respect to the longitudinal vehicle axis as 0.4 degree down in the vertical plane and 2.0 degrees right in the horizontal plane or any other suitable values depending upon the particular lamp and installation. This aiming specification may be incorporated readily into the angular position established for the aiming plane and proper headlamp aim is accomplished merely by adjusting the lamps until the aiming plane is perpendicular to the longitudinal axis of the vehicle.

Figure 5:
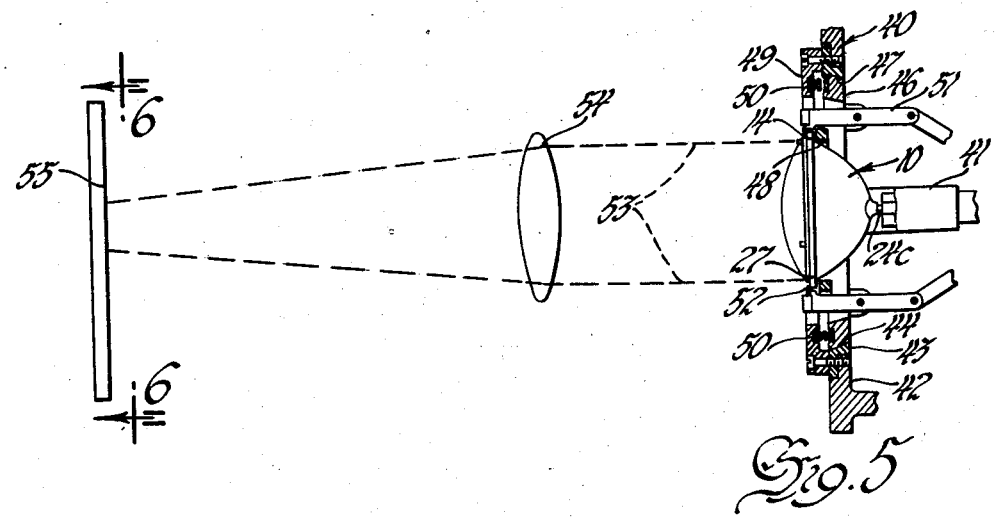
Figure 5 illustrates diagrammatically a suitable arrangement for pre-aiming the lamp during manufacture.
Figure 6:
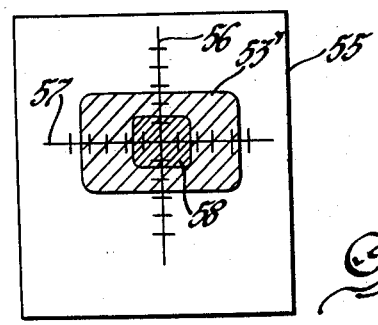
Figure 6 is a sectional view taken on line 6—6 of the apparatus in Figure 5.

A suitable manner in which the pre-aiming of the lamp is accomplished to establish the desired angular relationship between the aiming plane and the selected beam axis is illustrated in Figures 4, 5, and 6. As shown in Figure 5 the lamp 10 is mounted in an aiming head, designated generally at 40, and is connected to an electrical socket 41 by terminals 24b and 24c. The electrical socket 41 is adapted to energize the major or upper beam filament 21 of the lamp from a source of electrical current (not shown). The aiming head 40 comprises a support member 42 which defines a circular opening adapted for reception of an annular socket member 43 provided with a spherical seating surface 44. A member 46 is provided with a sperical surface 47 disposed in mating engagement with the spherical surface 44 and supports a seating ring 48. An annular plate 49 is secured to the support member 42 by suitable fastening means and a plurality of springs 50 are interposed between the plate 49 and the member 46. The lamp 10 is supported in the aiming head 40 by engagement of seating surfaces 14 with the support ring 48 and is secured in place by plural retaining levers 51. The retaining levers 51 are pivotally mounted on member 44 and are provided with resilient projections 52 which engage the flange 27 of the lamp. It will be apparent that the direction of the light beam projected from the lamp 10 may be angularly adjusted about the center of curvature of spherical surface 47 by pivotal motion of the member 46. Pivotal motion may be imparted to the member 46 by any suitable means either manual or automatic through the retaining levers 51.

The light beam, designated schematically at 53 projected from the lamp 10, may be projected through any suitable optical system represented by a condensing lens 54 to an aiming screen 55. As shown in Figure 6, the aiming screen 55 is provided with suitable reference means such as the rectangular coordinate lines 56 and 57. For purposes of illustration, a light beam is shown which produces an illumination pattern on the screen 55 having a configuration 53' which depends upon the optical design of the lamp 10. The light beam includes a portion of hot spot light which produces a pattern 58 of a high level of illumination on the screen 55. The lamp 10 is aimed by directional adjustment in aiming head 40 until an axis of a selected portion of the beam 53 is positioned in the desired relation with the coordinate lines 56 and 57 on the aiming screen 55.

With the selected axis of the light beam adjusted to its desired position on the aiming screen, the member 46 of the aiming head 40 is fixed in position with respect to support member 42 by suitable means not shown. To establish the aiming plane having a predetermined angular relationship with the selected beam axis, the reference elements 30, 31 and 32 are altered to provide the surfaces 30a, 31a, and 32a. This is illustrated in Figure 4 wherein the member 46 is fixed with respect to the support member 42 and a cutting tool designated generally at 60 is disposed in a known relation to the support member 42. The cutting tool 60 comprises a retaining head 61 mounted on a rotatable and reciprocable shaft 62. The retaining head 61 supports an annular abrasive cutter having a plane axial surface 64 normal to the axis of shaft 62. The cutting tool 60, as shown in the alternate position 60, is rotatably driven and is moved toward the lamp 10 until the abrasive cutter 63 engages and removes stock from each of the reference elements 30, 31, and 32. Upon completion of this cutting operation, cutting tool 60 is retracted and the lamp 10 is removed from the aiming head 40.

The lamp 10 is thus provided with an aiming plane defined by the surfaces 30a, 30b, and 30c. The aiming plane bears a predetermined angular position with respect to the direction of the selected portion of the light rays projected from the lamp. By use of the aiming plane upon installation of the lamp for use, aiming of the projected light may be accomplished with optical precision by simple geometrical instruments.

The description of this invention has been given with respect to a particular embodiment for illustrative purposes only and is not to be construed in a limiting sense. Many modifications and variations within the spirit and scope of the invention will now occur to those skilled in the art. For a definition of the invention, reference is made to the appended claims.

We claim:

1. A lamp comprising a light source, and optical means adjacent the source for transmitting light rays emanating from the light source, said lamp having a desired optical axis coinciding with a mechanical axis of the lamp and an actual optical axis, defined by the light rays displaced therefrom by an unknown deviation angle, and direction defining means on said lamp having a predetermined angular relation to said actual optical axis.

2. In combination with an optically imperfect lamp of the type which includes a light source and optical means adjacent the source for transmitting the light rays from said source, the improvement comprising a plurality of spaced reference elements on said lamp defining a plane having a predetermined angular relation to the direction of the light rays transmitted by the optical means.

3. A lamp comprising a light source and optical means for transmitting light rays emanating from said source, said lamp including means disposed on the optical means defining a mounting plane, said light rays defining an actual optical axis bearing an unknown angular relation to the mounting plane, and additional means on said optical means defining an aiming plane bearing a predetermined angular relation to said actual optical axis.

4. A lamp comprising a light source and optical means adjacent the source for transmitting light rays emanating from the source, said lamp including means defining a mounting plane and an actual optical axis bearing an unknown angular relation to the mounting plane, and a plurality of spaced reference elements on said lamp defining a plane having a predetermined angular relation to the direction of the light rays transmitted by the optical means.

5. In combination, a light source, a reflector for imparting directional control to the light rays from said source, a lens for imparting distributional control to the light rays from said reflector, said reflector and lens being combined and enclosing said source, means on the reflector defining a mounting plane for the lamp, and at least three spaced projections integral with said lens having surfaces which lie in a common aiming plane, said aiming plane having a predetermined angular relation to the direction of a selected portion of the light rays controlled by said lens.

6. A lamp comprising a light source, a reflector for directing the light rays emanating from the source, a lens secured to said reflector and controlling the distribution of the light rays directed by said reflector, and means on said lamp defining an aiming plane having a predetermined known position relative to the direction of selected light rays controlled by said lens.

7. A lamp comprising a light source, a reflector for imparting directional control to the light rays emanating from the source, a lens on said reflector enclosing said source and imparting distributional control to the light rays directionally controlled by said reflector, and at least three spaced surface elements on said lamp defining an aiming plane for said lamp having a predetermined known position relative to the direction of a selected portion of the light rays controlled by said lens.

8. In a lamp comprising a light source, an integral reflector and lens structure enclosing said light source for imparting directional and distributional control to the light rays emanating from said source, said lamp being characterized by the fact that the exact direction of the controlled light rays with respect to said reflector and lens structure is unknown, and means on said lamp defining an aiming plane having a predetermined known position relative to the direction of a selected portion of the controlled light rays.

9. A lamp comprising a light source, an integral reflector and lens structure enclosing said light source for imparting directional and distributional control to the light rays emanating from said source, means on the reflector defining a mounting plane, said lamp being characterized by the fact that the exact direction of the controlled light rays relative to said mounting plane is unknown, and plural spaced elements on said lens defining an aiming plane having a predetermined known position relative to the direction of a selected portion of the light rays controlled by said lens.

10. A lamp comprising a light source, an integral reflector and lens structure enclosing said light source for imparting directional and distributional control to the light rays emanating from said source, and plural spaced projections formed integral with said lens and defining an aiming plane having a predetermined known position relative to a portion of the controlled light rays from said lamp.

11. In combination, a light source disposed within a reflector for imparting directional control to the light rays emanating from the source, a lens disposed over said reflector for imparting distributional control to the light rays directed by the reflector, means on the reflector defining a mounting plane, the light source, reflector and lens being integrally joined to form a lamp characterized by the fact that the exact direction of the controlled light rays projected therefrom is unknown with respect to said mounting plane, and at least three projections formed integral with said lens adjacent the periphery of the latter, all of said projections having a surface lying in a predetermined common plane disposed in a known position relative to selected light rays projected from said lamp.

References Cited in the file of this patent

UNITED STATES PATENTS

| | | |
|---|---|---|
| 1,983,362 | Geiger et al. | Dec. 4, 1934 |
| 2,177,217 | Howard et al. | Oct. 24, 1939 |
| 2,194,373 | Wright | Mar. 19, 1940 |
| 2,252,476 | Wright | Aug. 12, 1941 |
| 2,260,736 | Benton | Oct. 28, 1941 |
| 2,609,611 | Dickson | Sept. 9, 1952 |